United States Patent [19]

Ishii et al.

[11] Patent Number: 4,777,199

[45] Date of Patent: Oct. 11, 1988

[54] COATING COMPOSITION

[75] Inventors: Keizou Ishii, Ashiya; Akio Kashihara, Hirakata, both of Japan

[73] Assignee: Nippon Paint Co., Ltd., Osaka, Japan

[21] Appl. No.: 945,012

[22] Filed: Dec. 22, 1986

[30] Foreign Application Priority Data

Dec. 25, 1985 [JP] Japan ................................ 60-294890

[51] Int. Cl.[4] .......................... C08J 3/08; C08L 33/08; C08L 33/10; C08L 33/14

[52] U.S. Cl. .................................... 524/284; 524/356; 524/379; 524/439; 524/556; 524/601; 524/923; 525/122; 525/123; 525/125; 525/131

[58] Field of Search ............... 524/923, 439, 556, 601, 524/379, 356, 284; 525/122, 123, 131, 125

[56] References Cited

U.S. PATENT DOCUMENTS

| | | | |
|---|---|---|---|
| 4,525,499 | 6/1985 | Hayashi et al. | 524/923 |
| 4,528,317 | 7/1985 | Theodore et al. | 524/923 |
| 4,533,695 | 8/1985 | Theodore et al. | 524/923 |
| 4,605,720 | 8/1986 | Chattha et al. | 524/923 |
| 4,611,026 | 9/1986 | Olson et al. | 524/923 |
| 4,611,028 | 9/1986 | Peng et al. | 524/923 |
| 4,639,394 | 1/1987 | Das et al. | 524/923 |

*Primary Examiner*—Allan M. Lieberman
*Attorney, Agent, or Firm*—Woodcock Washburn Kurtz Mackiewicz & Norris

[57] ABSTRACT

A coating composition comprising (A) a film-forming polymer having functional group(s) capable of reacting with the crosslinking agent (D) hereinafter referred to and cationic or anionic functional group(s), (B) a volatile organic liquid diluent in which the polymer (A) is dissolved, (C) crosslinked polymer microparticles bearing anionic or cationic functional group(s) whose electric charge is opposite to that of the film-forming polymer, which are insoluble in the combination of the film-forming polymer (A) and the diluent (B) and are maintained in a stabilized state of dispersion therein, and (D) a crosslinking agent dissolved in the diluent (B).

9 Claims, No Drawings

COATING COMPOSITION

FIELD OF THE INVENTION

The present invention relates to a coating composition and more specifically, it concerns a coating composition containing crosslinked polymer microparticles, which is particularly useful as decorative coating for automobile bodies and other articles.

BACKGROUND OF THE INVENTION

Recently, a high solid coating composition comprising crosslinked polymer microparticles dispersed in a conventional coating composition containing film-forming resinous vehicle, has been watched with keen interest in various coating areas and especially in an automobile industry, because of the eminent workability and capability of obtaining a coating with excellent film properties. These particles are composed of polymer crosslinked to the extent that it is insoluble in an organic solvent in which the particles are dispersed, finely pulverized to micron size, and stably dispersed in the coating composition. Dispersion of said microparticles in a solvent or a carrying vehicle is often called, for convenience, as "microgels". However, when microgel particles and coating resinous vehicle are lacking in mutual affinity, there are such problems that thus obtained coating composition will generate precipitations through agglomeration of said microgel, during storage and there give troubles in gloss and smoothness of the resulted coating likewise through agglomeration of microgel particles in both coating and drying steps. Employment of an emulsifier or dispersing agent will obviate said agglomeration, but it will cause additional problems of poor qualities of the formed coating such as water proofness and the like.

Attempts have therefore been made to settle the abovementioned problems, to get a far stabilized dispersion of polymer microparticles in resinous vehicle with the help of various specific type emulsifiers; however, no satisfactory solutions have been found yet. Under the circumstances, it would be an immeasurable advancement of the technical level concerned if one could provide a highly stabilized dispersion of microgel particles in a resinous vehicle without relying on a specific type of emulsifier and provide a high solid coating composition based on said dispersion, which is excellent in storage stability and capable of resulting in a coating with excellent gloss and improved appearance.

SUMMARY OF THE INVENTION

The principal object of the present invention is, therefore, to provide a high solid coating composition containing crosslinked polymer microparticles in a stabilized state of dispersion therein, which is excellent in storage stability, capable of resulting in a coating with excellent gloss and appearance, and which is specifically useful as a decorative coating for automobile bodies and other articles. The other objects of the invention will be apparent from the description of the specification and accompanying claims. According to the present invention, the abovesaid objects can be attained with a coating composition comprising (A) a film-forming polymer having functional group(s) capable of reacting with the crosslinking agent (D) hereinafter referred to and having cationic or anionic functional group(s), (B) a volatile organic liquid diluent in which the polymer (A) is dissolved, (C) crosslinked polymer microparticles bearing anionic or cationic functional group(s) whose electric charge is opposite to that of the film-forming polymer, which are insoluble in the combination of the film-forming polymer (A) and the diluent (B) and are maintained in a stabilized state of dispersion therein, and (D) a crosslinking agent dissolved in the diluent (B).

The inventors have found that when anionic or cationic functional groups are introduced in a film-forming polymer to be used as a resinous vehicle in a coating composition and cationic or anionic functional groups whose electric charge is opposite to that of the functional group of said film-forming polymer are introduced in crosslinked polymer microparticles, an extremely stable dispersion can be obtained with the combination of said film-forming polymer and said crosslinked polymer microparticles, since an adsorption layer of said film-forming polymer is formed on the whole surface of the respective microparticles through an electrostatic interaction of these functional groups. The inventors have also found that the thus obtained coating composition is excellent in storage stability and is excellent in gloss and appearance. On the basis of these findings, the invention has been made.

PREFERRED EMBODIMENTS OF THE INVENTION

The film-forming polymer constituent (A) of the composition of this invention may be any polymer known to be useful in coating compositions, provided at it has a functional group capable of reacting with the crosslinking agent (D) hereinafter referred to as, for example hydroxyl group, and it has a cationic functional group such as, for example, amino group, mono-substituted amino group, di-substituted amino group or ammonium group or an anionic functional group such as, for example, carboxyl group, sulfonic acid group or phosphoric acid group.

Examples of such polymers are acrylic, alkyd and polyester resins bearing such two kinds of functional groups. Usually, they have an acid value of 0.5 to 60, hydroxyl number of 20 to 200 and number average molecular weight of about 500 to 10,000.

To attain or promote hardening of said polymer (A), a crosslinking agent (D) is compounded together. This may be any of the known crosslinking agents customarily used in the related field, providing that it is soluble in an organic liquid diluent (B) and is capable of reacting with the abovementioned functional group of the film-forming polymer constituent (A). Appropriate members are, for example, diisocyanates, diepoxides and aminoplast resins. Particularly preferable ones are melamine-formaldehyde condensation products, substantial portions of whose methylol groups are etherized with butanol or methanol. The abovesaid film-forming polymer (A) is carried in a volatile organic liquid diluent (B) in the form of dispersion or solution, or may be partly in dispersion and partly in solution, though the crosslinking agent (D) is necessarily dissolved therein. Examples of such volatile organic liquid diluents are aromatic hydrocarbons such as toluene, xylene and petroleum fractions of various boiling point ranges having a significant aromatic content, esters as butyl acetate, ethylene glycol diacetate and 2-ethoxyethyl acetate, ketones such as acetone and methyl isobutyl ketone, alcohols such as butyl alcohol, aliphatic hydrocarbons and mixtures thereof.

Besides the abovementioned film-forming polymer constituent (a), crosslinking agent (D) and volatile organic liquid diluent (B), the coating composition of this invention, as the most characteristic feature thereof, contains novel polymer microparticles (C) hereinunder defined. The polymer microparticles (C) present in the composition of the invention are crosslinked polymer microparticles bearing anionic or cationic functional groups whose electric charge is opposite to that of the functional groups of said film-forming polymer, which are insoluble in the combination of the film-forming polymer (A) and the diluent (B) and are maintained in a stabilized state of dispersion therein. From the standpoint of preparation easiness, particularly preferable members are crosslinked acrylic or vinyl resin microparticles. Such microparticles may be easily and advantageously prepared by the copolymerization of at least 3 $\alpha,\beta$-ethylenically unsaturated monomers, the first member being $\alpha,\beta$-ethylenically unsaturated compound having an anionic or cationic functional group, the second member being crosslinking monomer(s) which is either a polyfunctional monomer having two or more ethylenical unsaturations in its molecule or combination of two different ethylenically unsaturated compounds each having mutually reactive functional group, and the third member being a $\alpha,\beta$-ethylenically unsaturated monomer other than the abovesaid first and second monomers, in an aqueous or organic medium in the presence of a dispersing agent. As the $\alpha,\beta$-ethylenically unsaturated compound having an anionic or cationic functional group, mention is made of (1) carboxyl bearing monomers such as, for example, acrylic acid, methacrylic acid, crotonic acid, itaconic acid, maleic acid, fumaric acid and the like, (2) sulfonic acid bearing monomers such as, for example, 2-acrylamide-2-methylpropane sulfonic acid, styrene sulfonic acid and the like, (3) nitrogen-containing alkyl acrylates or methacrylates such as, for example, dimethylaminoethyl acrylate, dimethylaminoethyl methacrylate, dimethylaminopropyl methacrylate and the like. Besides the above, phosphoric acid bearing monomers and ammonium group containing monomers may likewise be used. Crosslinking monomers may be any of the known monomers of functionality greater than two. Preferable members are the so-called polyfunctional monomers having two or more ethylenical unsaturations in its molecule such as polymerizable unsaturated monocarboxylic esters of polyhydric alcohol, polymerizable unsaturated alcoholic esters of polycarboxylic acid and aromatic compounds substituted with two or more vinyl groups. Examples of such members are ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol diacrylate, glycerol dimethacrylate, glycerol allyloxy dimethacrylate, 1,1,1-tris-hydroxymethylethane triacrylate, 1,1,1-tris-hydroxymethylethane dimethacrylate, 1,1,1-tris-hydroxymethylethane trimethacrylate, 1,1,1-tris-hydroxymethylpropane diacrylate, 1,1,1-tris-hydroxymethylpropane triacrylate, 1,1,1-tris-hydroxymethylpropane dimethacrylate, 1,1,1-tris-hydroxymethylpropane trimethacrylate, triallyl cyanurate, triallyl isocyanurate, triallyl trimellitate, diallyl terephthalate, diallyl phthalate, and divinyl benzene.

Crosslinking monomers may also be the combination of two ethylenically unsaturated monomers each bearing mutually reactive functional group such as, for example, the combination of epoxy bearing ethylenically unsaturated monomers, such as glycidyl acrylate and glycidyl methacrylate, and carboxyl bearing ethylenically unsaturated monomers, such as acrylic acid, methacrylic acid and crotonic acid. Other examples of combinations of mutually reactive functional groups are amine and carbonyl, epoxide and acid anhydride, amine and acid chloride, alkyleneimine and carbonyl, organoalkoxysilane and carboxyl, hydroxyl and isocyanate, and the like.

In this invention, other $\alpha,\beta$-ethylenically unsaturated monomers than the abovesaid first and second groups may be copolymerizable therewith. Examples of such monomers are as follows:

(1) hydroxyl bearing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol, (2) polymerizable amides as, for example, acrylic amide and methacrylic amide, (3) polymerizable nitriles as, for example, acrylonitrile and methacrylonitrile, (4) alkyl acrylates or methacrylates as, for example, methyl acrylate, methyl methacrylate, ethyl acrylate, n-butyl acrylate, n-butyl methacrylate and 2-ethylhexyl acrylate, (5) polymerizable aromatic compounds as, for example, styrene, $\alpha$-methyl styrene, vinyl toluene and t-butyl styrene, (6) $\alpha$-olefins as, for example, ethylene and propylene, (7) vinyl compounds as, for example, vinyl acetate and vinyl propionate, (8) diene compounds as, for example, butadiene, isoprene and the like.

These monomers are used alone or in combination. These three groups of $\alpha,\beta$-ethylenically unsaturated monomers are reacted in an aqueous or organic liquid medium in the presence of a dispersing agent or emulsifier in a conventional way, to obtain microparticles of crosslinked copolymer bearing anionic or cationic functional groups, whose electric charge is opposite to that of the functional groups of the film-forming polymer.

In this invention, the polymer microparticles (C) and the film-forming polymer (A) are electrostatically combined together by the functional groups carried on the respective polymers, and hence the whole surfaces of the polymer microparticles (C) are covered with the film-forming polymer (A) and such microparticles can be stably dispersed in the combination of said film-forming polymer (A) and the diluent thereof. Therefore, there is indeed the necessity of using a certain amount of emulsifier or dispersion colloid for the preparation of said crosslinked polymer microparticles through an emulsion polymerization or NAD method, but no need of using a particular type of dispersing agent or emulsifier for the dispersion of thus obtained crosslinked polymer microparticles in a dispersing medium. Thus, in the present invention, a relatively smaller quantity of emulsifier is used only for the purpose of preparation of said microparticles and therefore there is the least adverse effects on the coating.

As the emulsifer, any of the members customarily used for an emulsion polymerization or NAD polymerization of α,β-ethylenically unsaturated compounds may be successfully used in the least effective amounts. However, from the standpoint of obtaining a better quality coating, it is more desirable that the emulsifer is of the nature of high polymer giving no or the least harmful effects on the formed coating. Thus, in the most preferable embodiment of the invention, the polymerization of α,β-ethylenically unsaturated monomers is carried out in the presence of a resin having an amphoionic radical of the formula:

in which R is a member selected from optionally substituted alkylene having 1 to 6 carbon atoms and phenylene groups, and Y is —COOH or —SO$_3$H, as an emulsifier as stated in Japanese Patent Application Kokai No. 129066/83.

Examples of such resins are alkyd, polyester, modified epoxy, acrylic, melamine and polyether resins having the amphoionic group of the formula:

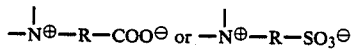

As to the details of such resins, reference should be made to said Japanese Patent Application Kokai No. 129066/83 (corresponding U.S. Pat. No. 4,461,870).

The polymerization may preferably and advantageously be carried out by adding a mixture of monomers to an aqueous medium containing the abovesaid amphoionic type resin, in the presence of polymerization initiator. The amount of said amphoionic type resin may vary within a comparatively wide range; however, in general, it is in the order of 0.3 to 8%, and preferably 0.5 to 6%, by weight of the total amount of monomers to be copolymerized. The crosslinking monomer may constitute 0.01 to 20%, most preferably 0.1 to 10%, by weight of the total polymerization monomers; however, this is not critical in the present invention. What is essential is to present the crosslinking monomer in the reaction system in sufficient quantity to make the microparticle polymer insoluble in the combination of film-forming polymer and organic liquid diluent. Usually, said insolubility of the microparticles may be checked by means of the following test. That is, the microparticles (1 part by weight) are shaken for 30 minutes with the organic liquid diluent (e.g. tetrahydrofuran) (100 parts by weight), the suspension is then centrifuged at 17,000 r.p.m. for 30 minutes. The supernatant liquid is decanted off and the residual polymer is dried and weighed. The weight of said polymer is compared with that of the microparticles originally taken. Where the result of this test indicates that the microparticles are acceptably insoluble in the diluent alone, it can be assumed that the particles will be at least equally insoluble in the combination of the film-forming polymer and the diluent.

The reaction medium, i.e. water, may be used in an amount so as to give a resinous emulsion of 2 to 65%, preferably 20 to 60%, non-volatile solid content. In order to assist the solubilization of said amphoionic resin, a quantity of basic material equivalent to the acid value may present in the reaction medium. As the basic materials, use can be made of alkali metal hydroxides, ammonia and organic amines, but for reason of volatile property and giving no residual inorganic ions in the formed coating, preference is given to ammonia or organic amine. The aqueous medium may also contain a water miscible organic solvent, if desired. As the polymerization initiator, any of the members known to be useful in the related technical field may satisfactorily be used, including organic peroxides such as benzoyl peroxide, t-butyl peroxide and cumene hydroperoxide, organic azocompounds as azobiscyanovaleric acid, azobisisobutyronitrile, azobis-(2,4-dimethyl)-valeronitrile, and azobis-(2-amidinopropane) hydrochloride, inorganic water soluble radical initiators as potassium persulfate, ammonium persulfate, sodium persulfate and hydrogen peroxide, and redox type initiators comprising the combination of said inorganic water soluble radical initiator and sodium pyrosulfite, sodium hydrogen sulfite or bivalent Fe ion. They may be used each alone or in combination. Such initiator may be previously contained in the reaction medium or may be added to the reaction system simultaneously with the addition of constituent monomers. The amount of initiator is usually in a range of from 0.05 to 5%, preferably 0.1 to 3%, by weight of the total monomers to be copolymerized. If desired, a normal chain transfer agent as lauryl mercaptan, hexyl mercaptan and the like may be present in an appropriate amount.

By the adoption of said emulsion polymerization techinique, a stably dispersed, milky or creamy resinous emulsion can be obtained, the average diameter of contained microparticles being in the range of from 0.02 to 0.5μ. When removing water from the emulsion by spray drying, solvent replacement, azeotropic distillation, centrifugal separation, filtering, drying and other appropriate means, a somewhat cohered polymeric mass having a maximum diameter of about 40μ can be obtained, which, however, is never a fused mass. Such product may be used directly or after being pulverized as the microparticles in the present high solid coating composition. For the purpose of drying said emulsion, a spray drying is most preferred because of the ease of operation and the particle diameter obtainable therewith.

Afternatively, the polymeric microparticles used in the invention may be prepared in a non-aqueous organic solvent by the so-called NAD method using the resin having an amphoionic radical as dispersion stabilizing agent. In that method, there is used a low polarity organic solvent that can be dissolved the monomers but not the polymer, like aliphatic hydrocarbons as exemplified by hexane, heptane and octane.

As previously mentioned, the amphoionic type resins used in the invention may be of the organic solvent soluble type and for the reasons of specific surface activity and electrochemical properties possessed, they are useful as effective dispersing and stabilizing agents in such circumstances. The reaction initiator to be used, operational details and after treatment in regard to NAD method are well known in the art and hence no particualr mention would be required thereon. It will be sufficient to say that even in NAD method, the polymeric particles having an average diameter of 1 to 40μ can be obtained. In either method, α,β-ethylenically unsaturated monomers and crosslinking monomers are successfully copolymerized in the presence of said amphoionic type resin, and without the necessity of using any additional emulsifier, and microparticles of polymer crosslinked to the extent that they are insoluble in the organic liquid diluent are obtained. Furthermore, thus formed microparticles are always accompanied, through physical adhesion, by the amphoionic type resin used, which has an excellent affinity to volatile organic liquid diluent to be used in the coating composition and therefore, when added to the composition for film-forming polymer, crosslinking agent and organic liquid diluent, they can be maintained in a stabilized state of dispersion in that system.

The inventors have previously found that an improved coating composition being excellent in application characteristics and storage stability and capable of resulting in a coating with excellent appearance can be obtained by using composite resin particles each of which comprises a granular body portion of crosslinked polymer having a mean diameter of 0.01 to 10μ and a number of linear polymer chains, a part of the respective chain penetrating into the inside of said granular body portion and the remaining part extending outwardly therefrom, in the combination with a common film-forming resin, and applied for a patent under Japanese Patent Application No. 267019/84 (now publicly opened as Kokai No. 223015/86).

In this invention, the crosslinked polymer microparticles (C) may have the similar composite structure, too. At that time, a mixture of α,β-ethylenically unsaturated compound bearing an anionic or cationic functional group and other α,β-ethylenically unsaturated compound(s) is polymerized in the presence of crosslinked polymer particles with a mean diameter of 0.01 to 10μ, by using a solution polymerization means to obtain composite resin particles each of which comprises a granular body portion of crosslinked polymer having a mean diameter of 0.01 to 10μ and a number of linear polymer chains having anionic or cationic functional groups, a part of the respective chain penetrating into the inside of said granular body portion and the remaining part extending outwardly therefrom. Thus obtained composite resin particles are used as the crosslinked polymer microparticles (C).

In the present invention, thus obtained microparticles are added to the film-forming polymer (A) organic liquid diluent (B) crosslinking agent (D) system to give a high solid coating composition. The compounding ratio of these four components may be freely varied in comparatively wide ranges depending on the application and the desired effect; however, in general, 50 to 99.5 parts by weight of the film-forming polymer (in terms of solid content) are compounded with 50 to 0.5 parts by weight of the microparticles. The amount of crosslinking agent is, in general, 5 to 100 parts by weight per 100 parts of the aggregated weight of the film-forming polymer and the microparticles (i.e. polymeric components) and the amount of organic liquid diluent is about 10 to 2000 parts by weight per 100 parts of the aggregated weight of said polymeric components and the crosslining agent (i.e. solid matters). If desired, the coating composition of this invention may further contain other conventional additives such as antioxidants, UV-absorbers, surface modifiers, viscosity modifiers, pigments, metal flakes and the like. No specific techiniques or apparatus are required for the preparation of the coating composition of this invention.

In the present coating composition, the film-forming polymer (A) and the crosslinked polymer microparticles (C) bear the functional groups whose electric charges are opposite to each other and the film-forming polymer (A) is strongly adsorbed on the surface of the respective crosslinked polymer particles (C) through the electrostatic attraction force acting therebetween.

Therefore, thus obtained microparticles can hardly agglomerate into mass in a coating composition comprising the film-forming polymer (A), which is believed to be the main reason why the present coating composition is excellent in storage stability and can provide a coating with excellent gloss and appearance.

The present coating compositions do possess an adequate fluidity for spray coating, and are able to make a thicker coating without the fear of sagging. The coatings exhibit high gloss and excellent film-performance.

Since the compositions contain neither a low molecular weight emulsifying agent nor a graft polymer dispersing agent usually found in the conventional compositions, which agents may cause deterioration of film properties and because the catings are only formed from the resinous material integrally crosslinked and hardened, from the abovesaid microparticles, film-forming polymer and crosslinking agent, they are quite useful as decorative coatings for automobile and other articles. This is due to the characteristics of the resulting films i.e., excellent durability and good appearance.

The invention shall be now more fully explained in the following Examples, which, however, should not be taken as being limitative in any sense. In these Examples, unless otherwise being stated, parts and % are by weight.

REFERENCE EXAMPLE 1

(a) Prepartion of polyester resin having an amphoionic group:

Into a 2 liters flask fitted with stirrer, nitrogen inlet pipe, thermoregulator, condenser and decanter, were placed 134 parts of bishydroxyethyl taurine, 130 parts of neopentylglycol, 236 parts of azelaic acid, 186 parts of phthalic anhydride and 27 parts of xylene, and the mixture was heated, while removing the formed water azeotropically with xylene. The temperature was raised to 190° C. in about 2 hours from the commencement of reflux and stirring and dehydration were continued until the acid value reached 145. Then the reaction mixture was allowed to cool to 140° C. and while maintaining the same temperature, 314 parts of Cardura E-10 (glycidyl versatate, manufactured by Shell Chem. Co.) were added dropwisely in 30 minutes. After continuing stirring for 2 hours, the reaction was completed. The thus obtained polyester resin had an acid value of 59, hydroxyl number of 90 and number average molecular weight of 1054.

(b) Preparation of anionic polymer microparticles (1):

Into a 1 liter reaction vessel fitted with stirrer, condenser and thermoregulator, were placed 281 parts of deionized water, 30 parts of the polyester resin obtained in the preceding paragraph (a) and 3 parts of dimethyl ethanolamine and the mixture was heated, while stirring, to 80° C. to get a clear solution. To this, were added 1.0 part of azobiscyanovaleric acid dissolved in a combined solution of 45 parts of deionized water and 0.9 part of dimethyl ethanolamine, and then dropwisely a mixture of 20 parts of methyl methacrylate, 30 parts of n-butyl acrylate, 70 parts of styrene, 15 parts of 2-hydroxyethyl acrylate, 5 parts of methacrylic acid and 60 parts of ethyleneglycol dimethacrylate was added over 60 minutes. After completion of said addition, 0.5 part of azobiscyanovaleric acid dissolved in a combined solution of 15 parts of deionized water and 0.4 part of dimethyl ethanolamine were added and the mixture was stirred at 80° C. for additional 2 hours to obtain an emulsion having a solid content 40%, and particle diameter 0.12μ. By subjecting the emulsion to a spray drying, polymer microparticles (1) were obtained.

(c) Preparation of anionic polymer microparticles (2):

Into a similar reaction vessel as used in the preceding paragraph (b), were placed 218 parts of deionized water, 1 part of ethyleneglycol dimethacrylate, 1.5 parts of methyl methacrylate, 4.5 parts of styrene, 2.0 parts of isobutyl methacrylate, 1.0 part of 2-hydroxyethyl acrylate and 2.0 parts of 2-acrylamide-2-methylpropane sulfonic acid and the mixture was, while stirring, heated to 70° C. To this, was added a solution of 1 part of ammonium persulfate in 10 parts of deionized water and the mixture was reacted for 10 minutes. Thereafter, a mixture of 9 parts of ethyleneglycol dimethacrylate, 25.5 parts of methyl methacrylate, 35.5 parts of styrene, and 18 parts of n-butyl acrylate was dropwise added in 2 hours. Finally, a solution of 0.2 part of ammonium persulfate in 5 parts of deionized water was added and the reaction was continued for 4 hours to obtain an emulsion having a solid content of 40% and a mean diameter of the microparticles contained of 0.35μ. The emulsion was subjected to a spraying drying to obtained the polymer microparticles (2).

(d) Preparation of cationic polymer microparticles (3):

Into a similar reaction vessel as used in the preceding paragraph (b), were placed 281 parts of deionized water 30 parts of the poyester resin obtained in (a) and 3 parts of dimethyl ethanolamine and the mixture was heated under stirring at 80° C. to obtain a clear solution. Next, a solution of 2,2'-azobis (2-amidinopropane) dihydrochloride in 45 parts of deionized water was added, and then a monomer mixture of 20 parts of methyl methacrylate, 30 parts of n-butyl acrylate, 70 parts of styrene, 15 parts of 2-hydroxyethyl acrylate, 5 parts of dimethylaminoethyl methacrylate and 60 parts of ethyleneglycol dimethacrylate was dropwise added in 60 minutes. Thereafter, a solution of 0.5 part of 2,2'-azobis (2-amidinopropane) dihydrochloride in 15 parts of deionized water was added and the combined mixture was stirred at 80° C. for 2 hours to obtain an emulsion having a solid content of 40% and a mean diameter of crosslinked polymer microparticles of 0.09μ. The emulsion was subjected to a spray drying to obtain the polymer microparticles (3).

(e) Preparation of anionic, film-forming polymer:

Into a 3 liters flask fitted with stirrer, thermoregulator, condenser and nitrogen gas inlet tube, were placed 200 parts of butylcellosolve and it was heated under stirring to 100° C. Next, a mixture of 300 parts of styrene, 245 parts of methyl methacrylate, 400 parts of n-butyl acrylate, 25 parts of 2-hydroxyethyl acrylate and 30 parts of acrylic acid, a mixture of 20 parts of azobisisobutyronitrile, 80 parts of methyl ethyl ketone and 40 parts of xylene, and 10 parts of lauryl mercaptane were simultaneously and dropwise added. Thereafter, a solution of 5 parts of azobisisobutyronitrile in a mixture of 20 parts of methyl ethyl ketone and 10 parts of xylene was dropwise added and the combined mixture was reacted at 100° C. for 2 hours. The temperature was then lowered to 70° C. and the mixture was added with 650 parts of xylene to obtain an acrylic resin varnish. Number average molecular weight of the acryl resin contained was 8320.

(f) Preparation of cationic, film-forming polymer:

The similar procedures as stated in the preceding paragraph (e) were repeated, excepting substituting 30 parts of dimethyl aminoethyl methacrylate for the monomer mixture of said (e), to obtain in acrylic resin varnish. Number average molecular weight of the resin was 9510.

EXAMPLE 1

20 parts of the anionic polymer microparticles obtained in the preceding Reference Example 1(b) were dispersed in a mixture of 42 parts of xylene, 30 parts of methyl isobutyl ketone and 8 parts of n-butanol. While stirring the dispersion in a disper, 280 parts of the cationic acryl resin varnish obtained in the preceding Reference Example 1(f) and 120 parts of U-van 20 SE-50 (trademark, butylated melamine of Mitsui Tohatsu Kagaku) were added to obtain a clear coating composition. After adjusting viscosity of said composition to a value which was appropriate to spraying (#4 Fordcup viscosity 25 seconds), thus obtained diluted composition was applied onto a tinplate vertically held, by a spray gun so as to give a dry thickness of 40μ. After standing for 5 minutes, the coated plate was baked at 140° C. for 25 minutes. PDG value (image sharpness value prescribed by Nihon Shikisai Kenkyu-sho and measured by Portable Distinctness of image Glossmeter manufactured by Tokyo Kodensha) of the coating was 0.8 and thus the coating appearance was excellent.

EXAMPLE 2

The same procedures as stated in Example 1 were repeated excepting substituting 20 parts of the anionic polymer microparticles obtained in the preceding Reference Example 1(c) for the anionic polymer microparticles of Example 1. PDG value of thus obtained coating was 0.7 and thus the coating appearance was excellent.

EXAMPLE 3

20 parts of the cationic polymer microparticles obtained in the preceding Reference Example 1(d) were dispersed in a mixture of 42 parts of xylene, 30 parts of methyl isobutyl ketone and 8 parts of n-butanol. While stirring said dispersion in a disper, 280 parts of the anionic acryl resin varnish obtained in the preceding Reference Example 1(f) and 120 parts of U-van 20 SE-60 were added and mixed well to obtain a clear coating composition. After adjusting the viscosity, thus obtained diluted composition was applied onto a tinplate and baked, as in Example 1. PDG value of the coating was 0.8 and thus the coating appearance was excellent.

COMPARATIVE EXAMPLE 1

The same procedures as stated in Example 1 were repeated excepting substituting 20 parts of the cationic polymer microparticles obtained in the preceding Reference Example 1 (c) for the anionic polymer microparticles of Example 1. PDG value of the coating was 0.5. Thus, the coating appearance was fairly good but inferior to that of the coating of Example 1.

COMPARATIVE EXAMPLE 2

The same procedures as stated in Example 3 were repeated excepting substituting 20 parts of the anionic polymer microparticles obtained in the preceding Reference Example 1 (b) for the cationic polymer microparticles of Example 3. PDG value of the coating was 0.5. Thus, the coating appearance was judged to be good by visual inspection but inferior to that of the coating of Example 3.

EXAMPLE 4 AND COMPARATIVE EXAMPLE 3

|  | Ex. 4 | Comp. Ex. 3 |
|---|---|---|
| resin varnish of Ref. Example 1 (e) | 125 | 125 |
| microparticles of Ref. Example 1 (d) | 5 | — |
| microparticles of Ref. Example 1 (b) | — | 5 |
| n-butanol modified melamine varnish | 25 | 25 |
| xylene | 15 | 15 |
| n-butanol | 5 | 5 |
| carbon black pigment | 6 | 6 |

Into a paint conditioner, the abovesaid materials were placed and the content was mixed well by using steel beads for 2 hours to obtain a coating composition, in Example 4 and then in Comp. Example 3. The baked coatings were prepared as in Example 1. PDG value and gloss value of the respective coating are shown in the following Table.

|  | PDG | gloss (60° gloss) |
|---|---|---|
| Example 4 | 0.8 | 98 |
| Comp. Example 3 | 0.4 | 92 |

What is claimed is:

1. A coating composition comprising
(A) a film-forming polymer having at least one functional group capable of reacting with a crosslinking agent and having at least one cationic or anionic functional group,
(B) a volatile organic liquid diluent in which the polymer (A) is dissolved,
(C) crosslinked polymer microparticles, bearing at least one anionic or cationic functional group whose electric charge is opposite to that of the at least one cationic or anionic group of said film-forming polymer (A), which are insoluble in the combination of the film-forming polymer (A) and the diluent (B) and are maintained in a stabilized state of dispersion therein, and
(D) a crosslinking agent dissolved in the diluent (B).

2. The composition according to claim 1, wherein the weight ratio of the film-forming polymer (A) to the crosslinked polymer microparticles (C) is 50:50 to 99.5:0.5, the weight ratio of (A)+(C) to the crosslinking agent (D) is 100:5 to 100:100 and the weight ratio of (A)+(C)+(D) to the organic liquid diluent (B) is 100:10 to 100:2000.

3. The composition according to claim 1, wherein the film-forming polymer is selected from the group consisting of acrylic resin and alkyd resin, having both hydroxyl group and carboxyl or amino group.

4. The composition according to claim 1, wherein the volatile organic liquid diluent is selected from the group consisting of an aliphatic hydrocarbon, an aromatic hydrocarbon, an ester, a ketone, an alcohol and any combination thereof.

5. The composition according to claim 1, wherein the crosslinking agent is an aminoplast resin or a polyisocyanate compound.

6. The composition according to claim 1, wherein the polymer microparticles (C) are crosslinked copolymer microparticles having an anionic functional group selected from carboxyl group, sulfonic acid group or phosphoric acid group, or a cationic functional group selected from amino group or ammonium group.

7. The composition according to claim 1, wherein the polymer microparticles (C) are crosslinked copolymer microparticles obtained by the copolymerization of at least 3 α,β-ethylenically unsaturated monomers, the first member being α,β-ethylenically unsaturated compound with an anionic or a cationic functional group, the second member being a polyfunctional monomer having two or more ethylenic unsaturations in its molecule or the combination of two ethylenically unsaturated compounds each having mutually reactive functional groups, and the third member being an α,β-ethylenically unsaturated monomer other than the abovesaid first and second members, in an aqueous or organic medium in the presence of a dispersing agent, having a mean diameter of 0.01 to 40μ.

8. The composition according to claim 7, wherein the dispersing agent is a resin having in its molecule an amphoionic group of the formula:

in which R is a member selected from substituted or unsubstituted alkylene having 1 to 6 carbon atoms or phenylene and Y is —COOH or —SO$_3$H.

9. The composition according to claim 1 further containing a metallic or non-metal pigment.

* * * * *